United States Patent [19]

Sakamoto et al.

[11] 4,234,217
[45] Nov. 18, 1980

[54] PIPE JOINT CONSTRUCTION

[75] Inventors: Suguru Sakamoto; Takuzo Nakazato; Tsugio Minoshima, all of Amagasaki; Tohachiro Tanaka, Tokyo, all of Japan

[73] Assignee: Sumitomo Kinzoku Kogyo Kabushiki Kaisha, Osaka, Japan

[21] Appl. No.: 888,275

[22] Filed: Mar. 20, 1978

[30] Foreign Application Priority Data

Mar. 22, 1977 [JP] Japan .................... 52-31947

[51] Int. Cl.² ........................................... F16L 13/02
[52] U.S. Cl. .................... 285/150; 285/158; 285/189; 285/286
[58] Field of Search ............... 285/286, 189, 150, 158

[56] References Cited

U.S. PATENT DOCUMENTS

| 1,859,259 | 5/1932 | Chamberlain et al. | 285/150 |
| 1,883,439 | 10/1932 | Adams | 285/189 |
| 1,889,874 | 12/1932 | Obert | 285/286 X |
| 1,992,960 | 3/1935 | Miller et al. | 285/286 X |
| 2,106,404 | 1/1938 | Ewing | 285/150 |
| 2,109,915 | 3/1938 | Watts | 285/286 X |
| 2,496,677 | 2/1950 | Reedy | 285/189 |
| 2,763,923 | 9/1956 | Webb | 285/158 |
| 2,916,308 | 12/1959 | Voldrich et al. | 285/286 X |
| 3,891,249 | 6/1975 | Moore | 285/286 X |
| 3,894,757 | 7/1975 | Best | 285/286 X |
| 3,934,787 | 1/1976 | Fels | 285/189 X |

FOREIGN PATENT DOCUMENTS

| 901179 | 1/1954 | Fed. Rep. of Germany | 285/286 |
| 329214 | 9/1935 | Italy | 285/189 |
| 366275 | 2/1932 | United Kingdom | 285/286 |

Primary Examiner—Thomas F. Callaghan
Attorney, Agent, or Firm—Ladas & Parry

[57] ABSTRACT

A pipe joint construction comprises a main pipe having a circular section of outer diameter D and one or more branch pipes having a circular section of outer diameter d. The wall thickness To of the main pipe is increased at the interior of the main pipe to a value T at the portion to which branch pipes are welded. The angle $\phi$ subtended by the portion of increased thickness at the center of the main pipe is determined by the following relationship, that is, $$1 > \phi/2\pi \geq (\alpha^2/k)(d/D)^{\frac{1}{2}}(D/T)^{\frac{1}{2}}(T/T_o)$$

where $\alpha$ represents a rigidity ratio and k is a constant.

5 Claims, 18 Drawing Figures

FIG. 11
FIG. 12
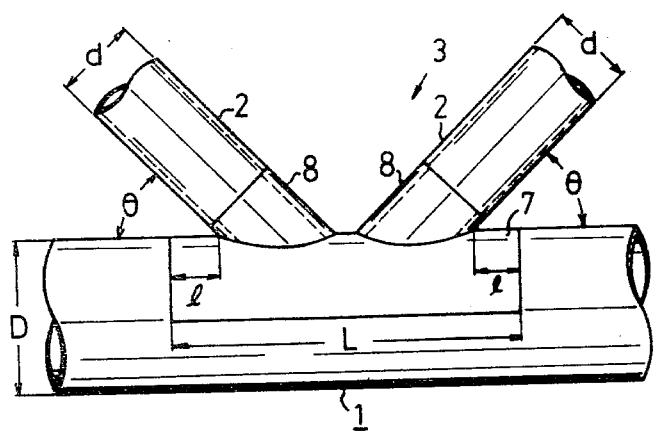
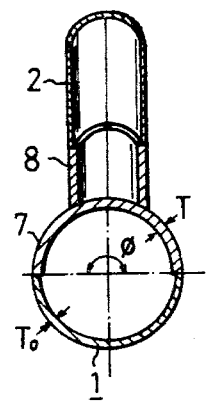
FIG. 13
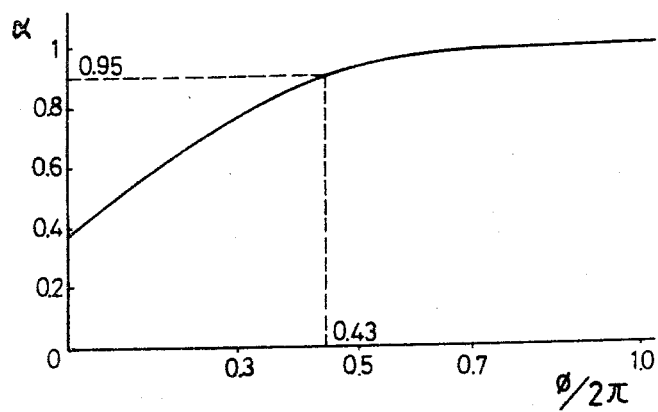

PIPE JOINT CONSTRUCTION

BACKGROUND OF THE INVENTION

1. Field of the invention

This invention relates to a joint construction of structural pipes.

2. Description of the prior art:

A pipe joint construction 3 in which, as shown in FIG. 1, branch pipes 2, 2 are jointed or welded to a main pipe 1 is of a geometrically complex shape, thus there tends to arise marked stress concentration.

In case the main pipe 1 is compressed under loads $F_1$, $F_2$, the branch pipe 2 is compressed under a load $F_3$, and the other branch pipe 2 is under tension by a load $F_4$, then stress concentrations occur at points $C_1$, $C_2$, $C_3$ on the weld lines of the main pipe 1 and the branch pipe 2. At this time, the maximum stress is created at the point $C_1$, at which the branch pipe 2 is jointed to the main pipe 1 at an obtuse angle, so that deformations as shown in FIGS. 2, 3 result, unless the rigidity of the main pipe 1 is high enough.

To cope with this, reinforcements as shown in FIGS. 4 to 9 have been hitherto used for pipe joint constructions 3A, 3B, 3C.

FIGS. 4 and 5 show reinforcements by means of a gusset plate 4 which is welded along the generation line of the main pipe 1 for reinforcing the axial rigidity of the main pipe 1.

FIGS. 6 and 7 show reinforcements by means of ring stiffener 5 which are secured on the outer surface of the main pipe 1, thereby reinforcing the peripheral rigidity of the main pipe 1.

FIGS. 8 and 9 show reinforcement by means of "can", that is, a cylindrical shell 6 is secured on the outer surface of the main pipe 1, to improve the rigidity thereof both in the axial and in the circumferential directions of the main pipe 1.

However, the gusset type reinforcement suffers from a drawback in that stresses tend to concentrate at the point $C_4$ on the outer surface of the branch pipe 2, resulting in marked lowering in fatigue strength of the branch pipe 2.

Meanwhile, the ring stiffener type reinforcement poses a problem of an inconvenient operation, while the can type reinforcement increase in weight of the pipe joint construction 3C, itself.

SUMMARY OF THE INVENTION

It is an object of the present invention to provide a pipe joint construction which is decreased in stress concentration, and is easy in manufacture and light in weight.

This and other objects, features and advantages of the present invention will be apparent from a reading of an ensuing part of the specification in conjunction with the accompanying drawings which indicate embodiments of the invention.

BRIEF DESCRIPTION OF THE DRAWINGS

FIG. 10' is the section of the construction of FIG. 10, as viewed from the right side;

FIG. 11 is a front view of the second embodiment of the present invention;

FIG. 12 is a side view of the construction of FIG. 11, as viewed from the right side;

FIG. 13 represents the analytical results of the relationship of the rigidity ratio vs a circumferential angle, which is obtained for the second embodiment of the invention;

DESCRIPTION OF THE PREFERRED EMBODIMENTS

Two embodiments of pipe joint constructions according to the present invention will now be hereinafter described.

Figure 10:
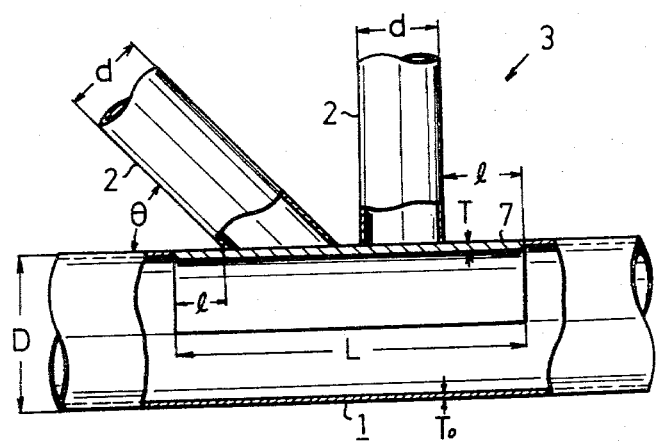
FIG. 10 is a front view illustrative of the first embodiment of a pipe joint construction according to the present invention.
Figure 10:
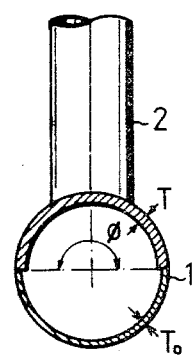

The first embodiment is shown in FIG. 10. In this embodiment, the portion on the wall of the main pipe 1 having the wall thickness To is cut-off in window shape, then the arcuate-plate 7 of T in wall thickness and of curvature as the main pipe of outer diameter D is therein fitted and are welded to form the circular section.

Branch pipes 2 of d in O.D. are welded to the wall-thickness-increased part and one of the two branch pipes are connected to the main pipe in right angle, while the other in angle $\theta$, respectively.

The range of the above wall-thickness increased portion is defined by the angle $\phi$ and the length L.

The length L of the wall-thickness-increased portion 7 in this embodiment should be determined in accordance with the requirements set forth in the rule of API (American Petroleum Institute). The minimum distance l between the trail of the branch pipe and the edge of the said portion in axial direction should exceed D/4 as defined in the API rule.

Figure 18:
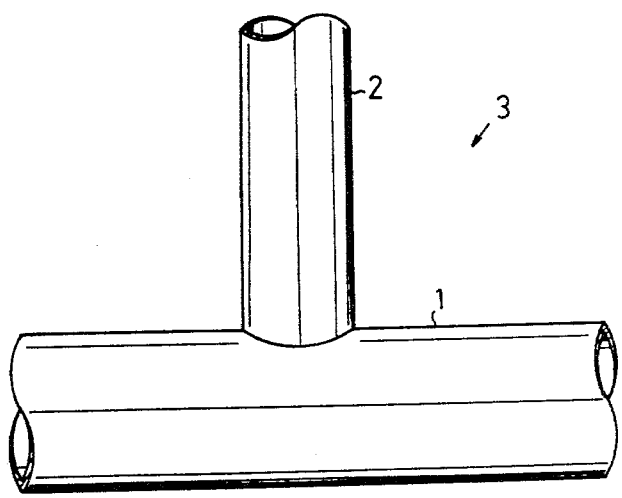
FIG. 18 is a front view of a 'T' shaped pipe joint construction.

The circumferential angle $\phi$ is determined to such a value as satisfying the following relationship which is obtained from the analysis based on Shell theory, that is, $$1 > \phi/2\pi \geq (\alpha^2/k)(d/D)^{\frac{1}{2}}(D/T)^{\frac{1}{2}}(T/To) \qquad (A)$$

where, $\alpha$ represents the ratio of rigidity required to that expected to the joint which is reinforced as much as $\phi = 2\pi$, k represents a shape factor of the joint and equal to 17 for T-Y and K joint shown in FIGS. 10 and 11, respectively, while k=12 for T joint shown in FIG. 18.

The second embodiment is shown in FIGS. 11 and 12 which employ K joint having two branch pipes inclined in equal angle $\theta$ to the main pipe.

In this embodiment, the branch pipes are connected to the wall-thickness-increased portion of the main pipe through the short stubs 8 having the same diameter d as the branch pipes and the greater wall thickness than the branch pipes. This leads to give the additional rigidity and load carrying capacity to the joint construction.

FIG. 13 shows the relation of $\phi/2\pi$ vs $\alpha$, which is obtained from the numerical analysis for the case where $T/T_o=2$, $d/D=0.33$, $D/T=5.48$ and $k=17$.

From FIG. 13, it can be read that the value of $\phi/2\pi$ which insure the rigidity of the joint construction on the wall-thickness-increased portion of the main pipe as much as 95% of the joint construction having the increased wall thickness on complete circumference, i.e. $\phi=2\pi$, of the main pipe, is 0.43 ($\phi=156°$). This means, in turn, that almost the maximum rigidity can be expected when $\phi$ is no less than the above value, even if the joint is not reinforced completely in circumferential direction of the main pipe.

Figure 1:
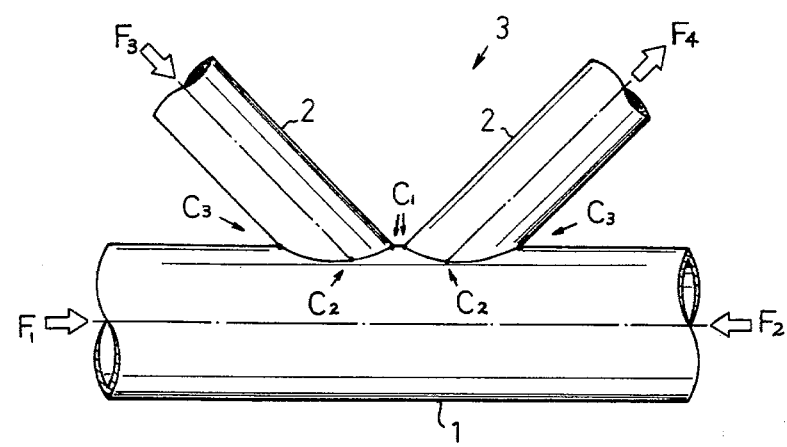
FIG. 1 is a front view illustrative of a prior art pipe joint construction having no reinforcement.
Figure 2:
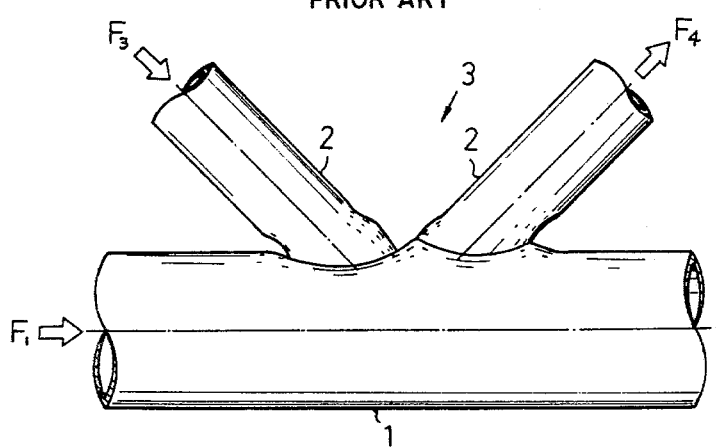
FIG. 2 is a front view illustrative of a failure mode of the prior art pipe joint construction.
Figure 3:
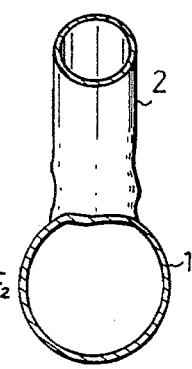
FIG. 3 is a side view of the construction of FIG. 2, as viewed from the right side.
Figure 4:
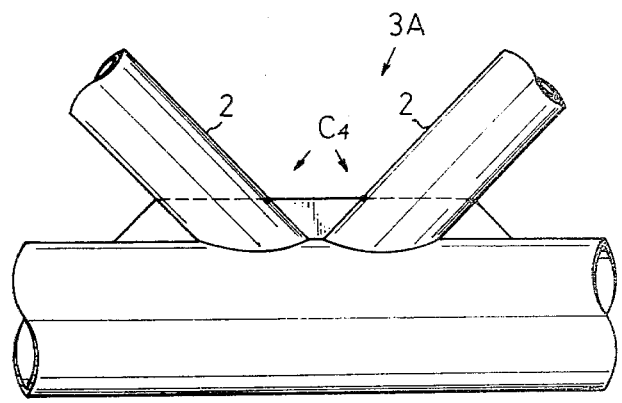
FIG. 4 is a gusset-reinforced pipe joint construction of the prior art.
Figure 5:
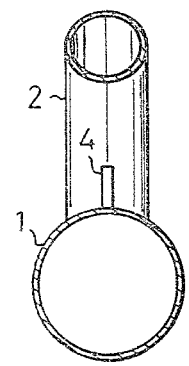
FIG. 5 is a side view of the construction of FIG. 4, as viewed from the right side.
Figure 6:
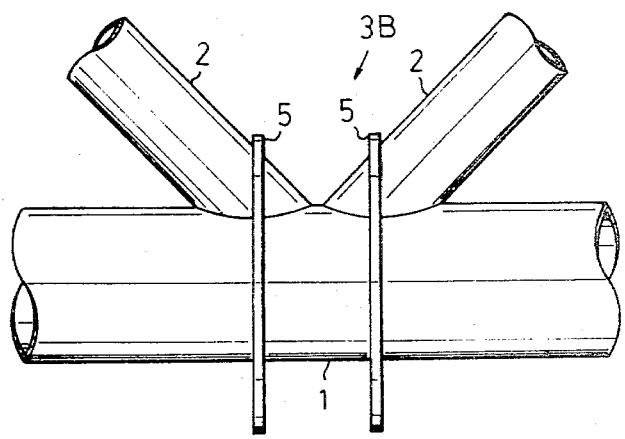
FIG. 6 is a front view of a ring-reinforced pipe joint construction of the prior art.
Figure 7:
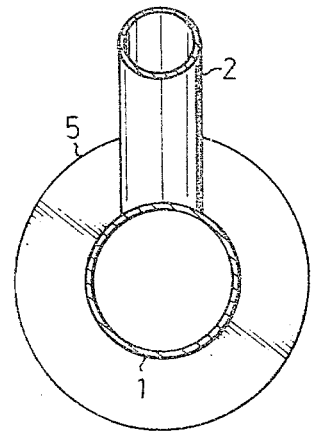
FIG. 7 is a side view of the construction of FIG. 6, as viewed from the right side.
Figure 8:
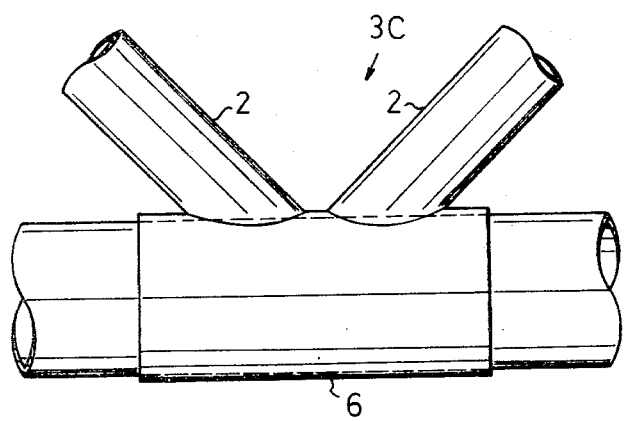
FIG. 8 is a front view illustrative of a prior art pipe joint construction, whose main pipe has been reinforced in wall thickness.
Figure 9:
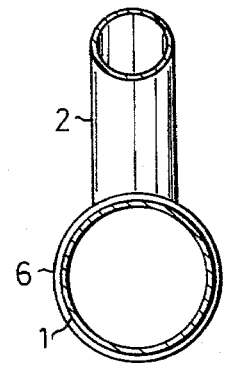
FIG. 9 is a side view of the construction of FIG. 8, as viewed from the right side.

The main pipe 1 is increased in thickness only by half the wall in cross section, thus, saving the weight of a pipe joint construction 3 to a large extent, compared with the pipe joint construction 3C illustrated in FIG. 8.

Furthermore, this embodiment may dispense with cylindrical shell 6 and the like, thus facilitating the manufacture of a pipe joint construction.

Figure 14:
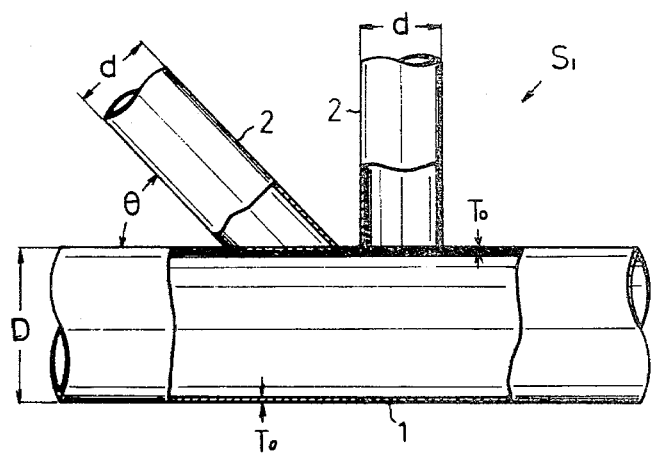
FIG. 14 is a front view of one of the specimens used for comparison with strength of the first embodiment.
Figure 15:
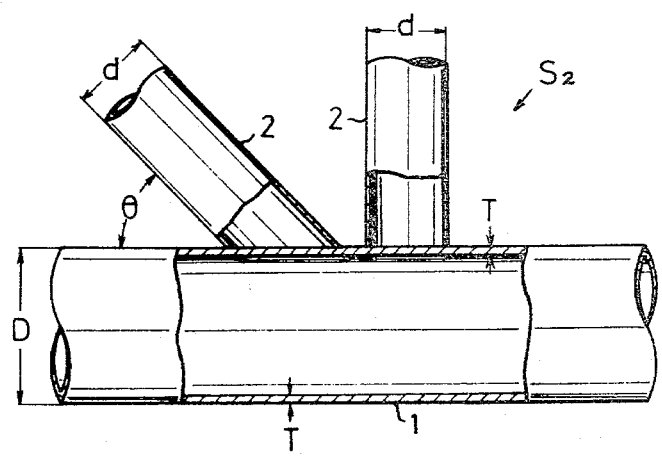
FIG. 15 is a front view of the other specimen.
Figure 16:
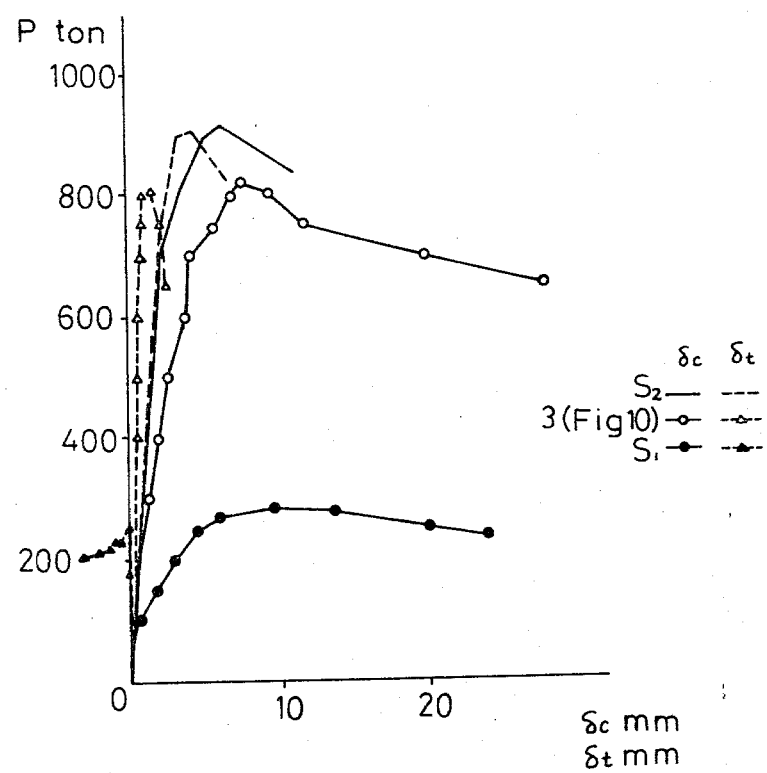
FIG. 16 shows static strength test results of these three specimens.
Figure 17:
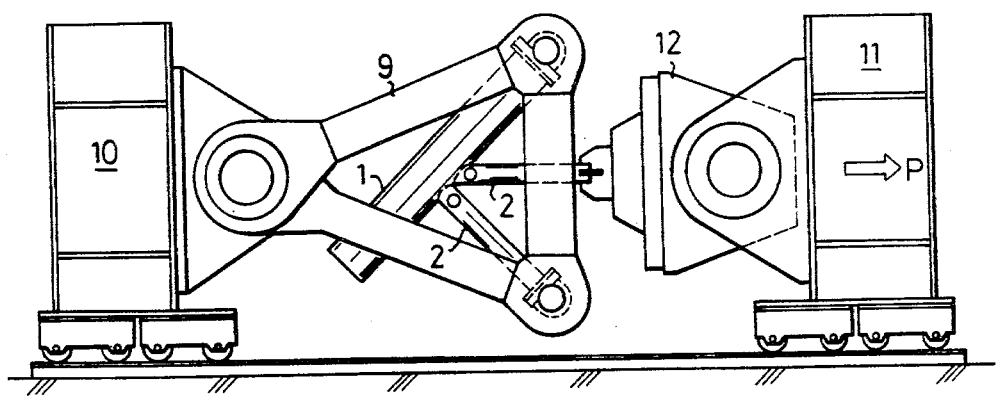
FIG. 17 illustrates the test set-up for strength test.

The strength of a pipe joint construction according to the first embodiment is compared with those of the samples $S_1$ of FIG. 14 and sample $S_2$ of FIG. 15. The sample $S_1$ has the wall thickness $T_o$ in the whole circumference of the main pipe 1, while the sample $S_2$ is increased in wall thickness to T. FIG. 17 shows the test setup and a specimen, wherein $D=762$ (mm), $T=22.5$ (mm), $T_o=10.5$ (mm) $d=323.9$ (mm) and $=45°$. More specifically, the one end of the branch pipe (vertical brace) 2, with the other end welded at a right angle to the main pipe 1, and one end of the main pipe were supported in a frame 9 by means of pins. The frame 9 was pinjointed to a cross-head 10, while the one end of another branch pipe (diagonal brace) 2 welded or jointed at an angle 45° to the main pipe 1 was pulled in the horizontal direction by the other cross-head 11 through an end tab 12. FIG. 16 shows the relationship of a load P acting on the latter branch pipe 2 to an axial displacement c of the former branch pipe 2, as well as to an axial displacement t of the diagonal branch pipe 2.

As can be seen from FIG. 16, the strength of the pipe joint of the first embodiment is about three times as high as that of the sample $S_1$, and 91% of that of the sample $S_2$. This proves that the strength of the joint of the first embodiment is substantially equal to that of the sample whose wall thickness has been increased in whole circumference and much higher than that of the sample $S_1$ whose wall thickness has not been increased.

Furthermore, the wall-thickness-increased portion 7 and 8 may be integrally formed by casting pipe joint portions, thereby avoiding the weld defects such as undercut, or shrinkage cracking, and the like.

As is apparent from the foregoing description, according to the pipe joint construction of the present invention, the wall-thickness-increased portion is defined by a central angle obtained from the relationship (A), and then branch pipes are jointed or welded to the wall-thickness-increased portion, thereby minimizing the stress concentration, and allowing the manufacture with ease and weight saving.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. A pipe joint construction comprising:
   a main pipe of circular external cross section and having a wall with outer diameter D, a major part of the wall being of thickness To and a portion of the wall of said main pipe integral with said major part having a wall thickness T greater than To; and
   at least one branch pipe having a circular cross section and an outer diameter d, the end of said branch pipe being welded to said portion of the wall of said main pipe, said portion of the wall of said main pipe subtending an angle $\phi$ at the center of said main pipe and said central angle being determined by the following relationship:

$$1 > \phi/2\pi \geq (\alpha^2/k)(d/D)^{1/4}(D/T)^{1/2}(T/T_o)$$

where $\alpha$ represents a rigidity ratio, and k represents a constant depending on the type of joint.

2. A pipe joint construction as claimed in claim 1, wherein $\phi/2\pi$ is on the order of 0.43.

3. A pipe joint construction as claimed in claim 1, comprising but a single branch pipe welded to said portion of the wall of said main pipe, and wherein the constant k has a value of approximately 12.

4. A pipe joint construction as claimed in claim 1, comprising a plurality of branch pipes welded to said portion of the wall of said main pipe, and wherein the constant k has a value of approximately 17.

5. A pipe joint construction as claimed in claim 1, wherein said branch pipe is welded to said portion of the wall of said main pipe through the medium of a stub having a wall thickness greater than that of said branch pipe and having an outer diameter d.

* * * * *